Feb. 13, 1951 W. H. HAWKINS 2,541,582
AUTOMOBILE TOW TRAILER
Filed April 21, 1949
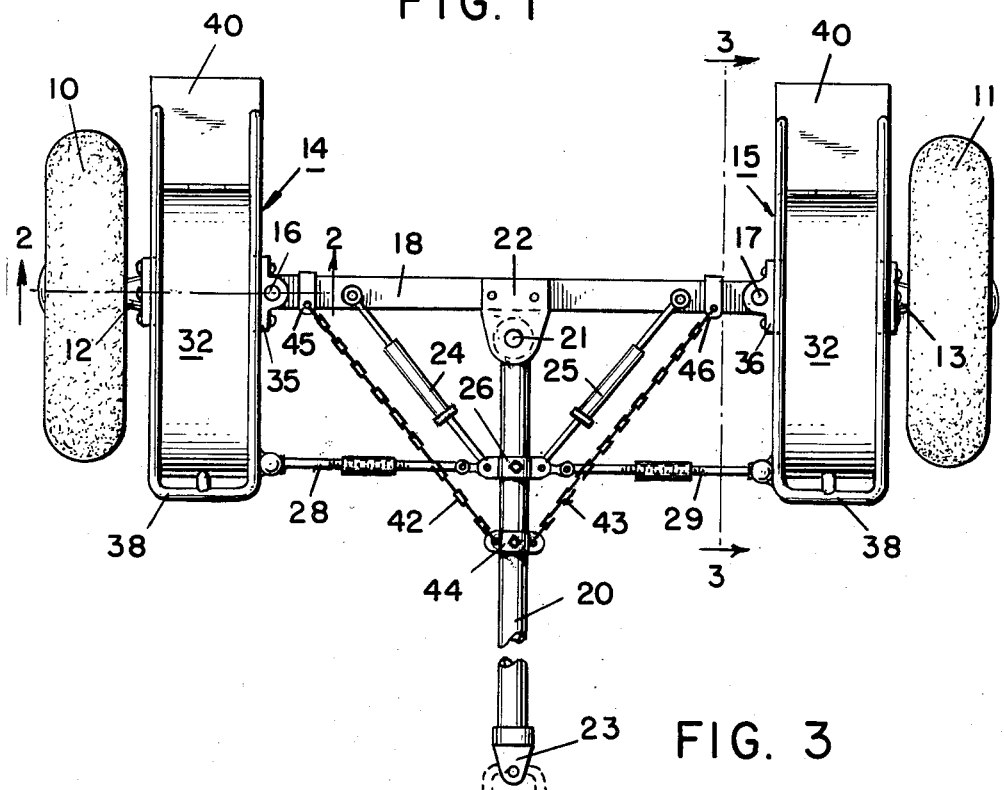
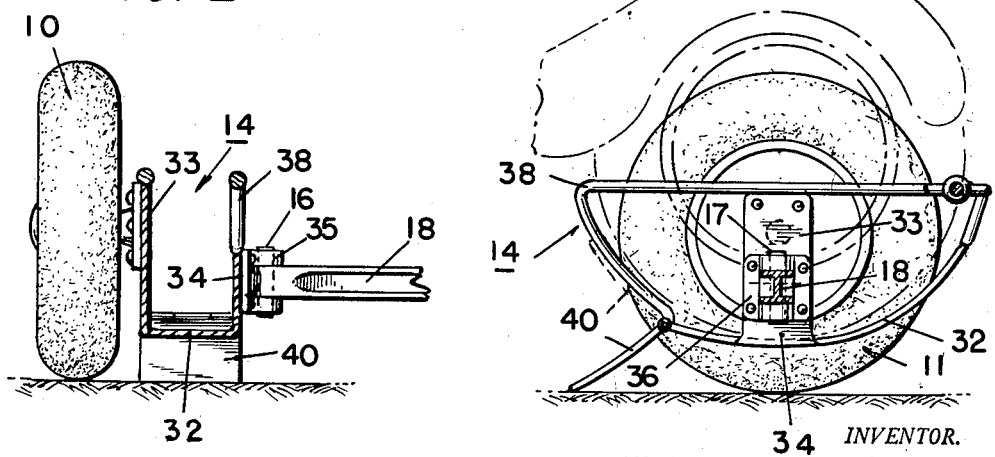
INVENTOR.
WALLACE H. HAWKINS,
BY
Attorney Patented Feb. 13, 1951

2,541,582

UNITED STATES PATENT OFFICE 2,541,582

AUTOMOBILE TOW TRAILER

Wallace H. Hawkins, Panama City, Fla.

Application April 21, 1949, Serial No. 88,785

9 Claims. (Cl. 280—33.5)

This invention relates to improvements in automobile tow trailers, and its principal object is to provide an automobile tow trailer designed especially for long-distance towing of automobiles, racing cars and the like, and capable also of satisfying the safety requirements of such type of service.

Automobile tow trailers as presently constructed are open to the objection that they cannot be employed safely in the long-distance and hence high-speed towing of automobiles and racing cars. When such trailers are of the non-steerable wheel type, the towed automobile cannot of course track on the tractor or service vehicle, so that towing at high speeds is extremely hazardous. In prior automobile tow trailers employing steerable wheels, the conventional close-spacing of steerable trailer wheels and spindles or king pins on which the wheels turn was universally employed, with the result that turning clearance for the steerable trailer wheels was not possible unless the towed automobile was set high on the trailer, or the trailer axle was sufficiently long as to provide for placement of the king pins outside of the lateral dimension of the automobile being towed. In the former case, the center of gravity of the towed automobile was raised to unsafe levels, with the result that it was likely to overturn when negotiating curves at high speed. In the latter case, the overall width of the trailer was increased to the degree that the trailer constituted a traffic hazard on highways as well as requiring a large turning radius.

The objectionable features of the prior tow trailers and the aforesaid desirable objectives of the present invention are achieved through the provision of an automobile tow trailer characterized principally by the inward displacement of the king pins on which the trailer wheels turn along the trailer axle as compared to prior trailers employing steerable wheels and the mounting of supporting cradles for the front wheels of the towed automobile in the relatively wide space between each king pin and steerable trailer wheel. According to a further feature of the invention, low-slung cradles are employed, with the advantageous result that the front end of the towed automobile is not raised appreciably from the road level. To provide turning clearance for the steerable trailer wheels without substantially increasing overall trailer width, the trailer wheels are somewhat smaller than the conventional automobile wheel, so that they may be cut into and out of the semi-circular front fender openings of the automobile being towed, in which openings they are received when the automobile is supported on the trailer cradles.

The above and other objects and features of advantage of the automobile tow trailer of the invention will be seen from the following detailed description thereof, taken with the accompanying drawings, in which—

Fig. 1 is a plan view of an automobile tow trailer as herein contemplated;

Fig. 2 is a section taken along line 2—2 of Fig. 1; and

Fig. 3 is a section taken along line 3—3 of Fig. 1.

In the drawings, illustrating one physical form of automobile tow trailer exemplifying the principles of the invention, reference characters 10, 11 designate two ground-engaging wheels turning on coaxially arranged stub axles 12, 13. The stub axles are rigidly fixed to the cradles 14, 15 which support the front wheels of an automobile, racing car or the like being towed, whereby its front end is raised from the ground. Accordingly, the supporting wheels 10, 11 and the cradles 14, 15 to which they are attached constitute turn units which are adapted to turn on the axes of the king pins or spindles 16, 17, by which the units are connected to the ends of a main axle 18. The aforesaid cradles are spaced laterally by an amount corresponding to the lateral spacing of the front wheels of the towed automobile, and it will be observed that the lateral spacing of the trailer wheels 10, 11 does not substantially exceed the spacing of the front wheels of the towed automobile. It will be seen, moreover, that the king pins 16, 17 are displaced a substantial distance inwardly from the trailer wheels 10, 11 as contrasted with the close spacing between steerable trailer wheels and king pins on which said wheels turn according to the conventional practice. By design, the spacing of king pins 16, 17 from each other is such that they are substantially vertically aligned with the close-spaced king pins of the automobile being towed.

The two-wheeled trailer as described is adapted to be connected to a tractor or service vehicle by a draft bar 20, the rear end of which is pivotally connected by a pivot bolt 21 to a coupling bracket 22 carried by the main axle 18 midway of its ends. At its forward end the draft bar is provided with a hitch 23 of any suitable and approved type. The draft bar 20 is also connected to the main axle 18 by equalizing members 24, 25, preferably of the spring type, said members being connected at their forward ends to the draft bar through a coupling collar 26 affixed to the draft bar, and at their rearward ends to the main axle adjacent the ends thereof.

To effect steering movement of the trailer wheels 10, 11 about the axis of the king pins 16, 17 corresponding to angular movement of the draft bar from its normal, right-angular relationship with main axle 18, connecting rods 28, 29 are provided, being connected at their inner ends to the collar bracket 26 and at their outer ends to the cradles 14, 15, respectively. As is well understood, the connecting rods constitute a link or link sections of a parallel linkage system functioning to maintain the cradles 14, 15 parallel with each other and with the draft bar 20, with the equalizing members 24, 25 tending to maintain the right-angular relationship of draft bar and main axle and of main axle and cradles, and also to return said parts to their normal relationship following angular movement of the draft bar.

As will be seen from Figs. 2 and 3, the cradles 14, 15 are low-slung relative to the common axis of the stub axles 12, 13 and also to the main axle 18. Said cradles may each comprise a concave base plate 32 provided along their side edges with upright plate extensions. The stud axles 12, 13 mounting the trailer wheels 10, 11 are rigidly secured to the outer side plate 33 of each cradle, which has vertical height as to hang the cradle base plate 32 at the proper level above the ground or roadway. To the relatively outer faces of the inner side plates 34 of the cradles are secured brackets 35, 36 provided with vertically spaced ears mounting the king pins 16, 17, whereby the brackets and king pins provide steering knuckles or joints. It will be observed from Fig. 2 that the inner side plate 34 of the cradles is shorter than the outer side plate 33 thereof, and thus the main axle 18 is disposed below the level of the stub axles 12, 13.

To provide a light-weight enclosure for the front wheels of the automobile being towed, each cradle base plate 32 mounts a wheel frame 38 of openwork construction. This frame may be formed of tubular or solid rod stock and consists generally of longitudinal side members and a front member supported above the cradle base plate by spacing legs connected to the base plate as by welding.

To facilitate the operation of running the front wheels of the automobile being towed on to the trailer, the base plates of the cradles each mount a hinged ramp plate 40 which is hingedly connected to the rear edge of the base plate. The ramp plates 40 may be dropped to the ground, as shown in full lines in Fig. 3, whereupon the automobile to be towed may readily be run on to the trailer so that its front wheels are supported in the cradles as shown in dotted lines (Fig. 3). Thereupon the ramp plates 40 may be swung to their dotted line position in which they are secured by suitable means, thus to close the rear end of the wheel enclosing frame 38.

It is desirable to provide means for preventing the trailer from jack-knifing when it is being towed unloaded. As shown, such means comprise chains 42, 43, detachably secured at their forward ends to a collar bracket 44 affixed to the draft bar 20 and permanently affixed at their rear ends to brackets 45, 46 carried by the main axle 18 adjacent its ends. When connected as shown, the chains positively prevent relative angular movement between main axle and draft bar 20 out of the right-angular relationship shown. However, when the trailer is loaded, the forward ends of the chains are uncoupled from the draft bar and may be employed to secure the axle of the vehicle being towed to and directly above the trailer axle 18. It will be understood that other or additional means of securing the automobile axle to trailer axle may be employed.

Due to the spacing of cradles 14, 15 to correspond to the spacing of the front wheels of the automobile being towed, taken with the close-coupling of trailer wheels 10, 11 and cradles, the outer or side edges of the fenders of the automobile being towed are contained in vertical planes passing through the trailer wheels. Normally, such would result in the fenders of the towed automobile interfering with the turning movement of the trailer wheels, unless the automobile were set high enough on the trailer so as to provide the necessary turning clearance. To provide the required turning clearance without resort to the unsatisfactory expedient of setting the automobile high on the trailer, the trailer wheels 10, 11 have slightly lesser diameter than is usual, which is such that the upper peripheries of said wheels may extend freely and without interference into the substantially semi-circular openings with which the front fenders of practically all automobiles of modern design are provided. By this arrangement, the trailer wheels 10, 11 may cut into and out of the fender openings of the automobile being towed without interference as they are steered about the axes of the king pins 16, 17.

It will be observed also that by virtue of the inward displacement of said king pins as compared to the close-coupled steering wheel and king pin arrangement of prior trailers, the king pins 16, 17 are substantially vertically aligned with the steering king pins of the towed automobile. This provides for the trailer wheels 10, 11 turning on axes which are for all practical purposes the same axes as those on which the front wheels of the towed automobile would turn in normal steering. Accordingly, the trailer wheels 10, 11 each functions much as the outer wheel of a dual wheel assembly as respects steering, in the sense each trailer wheel and the paired front wheel of the automobile being towed are steerable about the same vertical axis. Thus, the trailer wheels are free to and do track the service vehicle, substantially as if the front wheels of the towed automobile were being steered to effect such tracking.

Without further analysis, it will be seen that this invention achieves in simple and practical manner the desirable objective of providing a trailer capable of towing automobiles, racing cars and the like, for long distances and at the high speeds usually attained in such long-distance towage. By virtue of the low-slung trailer cradles, the front end of the towed automobile is not unduly elevated, with the result that it may be towed around sharp corners without danger of overturning. The inward displacement of the king pins on whose axis the trailer wheels turn serves two principal purposes. It provides for the front end of the towed automobile being set low as aforesaid, and it also permits effective steering action of the trailer wheels without substantially increasing overall trailer width. Hence, the tow trailer of the invention may be used on narrow roads without giving rise to traffic hazards.

As many changes could be made in carrying out the above construction without departing from the scope of the invention, it is intended

I claim:

1. In an automobile tow trailer, a main axle member, a draft bar pivotally connected to the mid point thereof, and steerable units pivotally connected to the ends of the main axle member, each unit comprising a wheel supporting cradle and a ground-engaging wheel supporting the cradle, the cradles being laterally spaced an amount corresponding to the spacing between the front wheels of the automobile to be towed.

2. An automobile tow trailer as set forth in claim 1, wherein the cradles are disposed intermediate the pivotal connection of units to main axle member and the ground wheels.

3. In an automobile tow trailer, a main axle member, a draft bar pivotally connected to the mid point thereof, steerable units pivotally connected to the ends of the main axle member, each unit comprising a wheel supporting cradle and a ground-engaging wheel supporting the cradle, the cradles being laterally spaced an amount corresponding to the spacing between the front wheels of the automobile to be towed, and means for effecting steering movement of the units upon pivotal movement of the draft bar.

4. In an automobile tow trailer, a main axle member, a draft bar pivotally connected to the mid point thereof, steerable units pivotally connected to the ends of the main axle member, each unit comprising a wheel supporting cradle and a ground engaging wheel supporting the cradle, the cradles being laterally spaced an amount corresponding to the spacing between the front wheel of the automobile to be towed, means for effecting steering movement of the units upon pivotal movement of the draft bar, and equalizing means operative between draft bar and main axle member for resisting pivotal movement of the draft bar.

5. In an automobile tow trailer, a main axle member, a draft bar pivotally connected to the mid point thereof, stub axles extending beyond the ends of the axle member, ground-engaging wheels turning on the stub axles, wheel supporting cradles disposed inwardly of the ground wheels and being spaced a distance corresponding to the spacing of the front wheels of an automobile to be towed, and king pin connections between the cradles and the ends of the main axle member whereby the cradles turn with the ground wheels.

6. An automobile tow trailer as set forth in claim 5, wherein the stub axles are rigidly fixed to the cradles whereby each cradle and its associated ground wheel turn as a unit.

7. In an automobile tow trailer, a main axle member, a draft bar pivotally connected to the mid point thereof, wheel supporting cradles adapted to support the front wheels of the automobile to be towed above the ground, and being spaced a distance corresponding to the spacing of the front wheels, king pin connections between the cradles and the ends of the main axle member, stub axles fixed to the cradles to extend outwardly therefrom, ground-engaging wheels turning on the stub axles and supporting the cradles above the ground, and means operative between said draft bar and cradles for causing steering movement of the ground wheels and cradles upon pivotal movement of the draft bar.

8. An automobile tow trailer as set forth in claim 7, wherein the ground wheels are close-coupled to the cradles, so that the overall width of the trailer does not substantially exceed the width of the automobile being towed.

9. An automobile tow trailer as set forth in claim 7, wherein the ground wheels are spaced an amount corresponding to the spacing between the outer edges of the front fenders of the automobile being towed, and wherein said ground wheels have diameter such that they extend into and may turn freely in the substantially semi-circular openings of the fenders.

WALLACE H. HAWKINS.

REFERENCES CITED

The following references are of record in the file of this patent:

UNITED STATES PATENTS

| Number | Name | Date |
| --- | --- | --- |
| 1,224,574 | Sessions | May 1, 1917 |
| 2,391,503 | Page | Dec. 25, 1945 |